(12) United States Patent
Garro et al.

(10) Patent No.: US 10,924,403 B2
(45) Date of Patent: Feb. 16, 2021

(54) USING A SINGLE CACHE TABLE

(71) Applicant: Hewlett Packard Enterprise Development LP, Houston, TX (US)

(72) Inventors: Diego Valverde Garro, San Jose (CR); Claudio Enrique Viquez Calderon, Heredia (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 266 days.

(21) Appl. No.: 15/746,345

(22) PCT Filed: Jul. 21, 2015

(86) PCT No.: PCT/US2015/041352
§ 371 (c)(1),
(2) Date: Jan. 19, 2018

(87) PCT Pub. No.: WO2017/014757
PCT Pub. Date: Jan. 26, 2017

(65) Prior Publication Data
US 2018/0212878 A1 Jul. 26, 2018

(51) Int. Cl.
*H04L 12/743* (2013.01)
*H04L 12/947* (2013.01)
*H04L 12/861* (2013.01)

(52) U.S. Cl.
CPC .......... *H04L 45/7457* (2013.01); *H04L 49/25* (2013.01); *H04L 49/9042* (2013.01)

(58) Field of Classification Search
CPC ........... G06F 2212/283; H04L 49/9042; H04L 45/74
See application file for complete search history.

(56) References Cited

U.S. PATENT DOCUMENTS

| | | | |
|---|---|---|---|
| 6,529,897 B1* | 3/2003 | Corl, Jr. | ................ H04L 47/10 |
| 8,204,871 B1* | 6/2012 | Pawar | ................ G06F 16/172 |
| | | | 707/705 |
| 2002/0089937 A1 | 7/2002 | Venkatachary et al. | |
| 2012/0246400 A1 | 9/2012 | Bhadra et al. | |
| 2013/0290622 A1 | 10/2013 | Dey et al. | |
| 2014/0136683 A1 | 5/2014 | Stark et al. | |

(Continued)

FOREIGN PATENT DOCUMENTS

WO  WO-2013/093858 A1  6/2013

OTHER PUBLICATIONS

Geant, "Deliverable D13.1 (DJ2.1.1) Specialized Applications Support Utilizing OpenFlow/SDN", Mar. 2, 2015, 97 Pgs.

(Continued)

*Primary Examiner* — Raj Jain
(74) *Attorney, Agent, or Firm* — Wall and Tong, LLP

(57) ABSTRACT

In an example implementation, a method is provided. The method includes receiving at a switch a packet having a tuple, wherein the tuple comprises a plurality of fields, wherein the switch operates using a protocol that compares each one of the plurality of fields to a table of a plurality of tables in series. The switch compares the plurality of fields of the tuple to a single cache table instead of the plurality of tables in series. When a match is found, a plurality of actions associated with the plurality of fields of the tuple is accumulated. The plurality of actions is applied to the packet.

15 Claims, 3 Drawing Sheets

(56) References Cited

U.S. PATENT DOCUMENTS

| | | |
|---|---|---|
| 2014/0195545 A1 | 7/2014 | Anand et al. |
| 2014/0241361 A1 | 8/2014 | Bosshart et al. |
| 2015/0081830 A1 | 3/2015 | Frydman et al. |
| 2015/0281098 A1* | 10/2015 | Pettit .................. H04L 47/2441 370/235 |
| 2015/0281125 A1* | 10/2015 | Koponen ................ H04L 45/64 711/122 |
| 2018/0212878 A1* | 7/2018 | Garro .................. H04L 45/7457 |

OTHER PUBLICATIONS

International Searching Authority, The International Search Report and Written Opinion, PCT/US2015/041352, dated May 30, 2016, 10 Pgs.

Moon, D et al, "Bridging the Software/Hardware Forwarding Devide", Oct. 7, 2010, 15 Pgs.

\* cited by examiner

USING A SINGLE CACHE TABLE

BACKGROUND

OpenFlow is a standard protocol for communication between the control and forwarding layers of a software defined network architecture. When a packet enters a switch in an OpenFlow implementation, multiple fields in the tuple are matched against a series of corresponding tables for each field to determine an action or routing for the packet.

A typical flow tuple can be very large. For example, a tuple can include a 128 bit wide Internet Protocol version 6 (IPV6) fields, port number, and the like. Thus, searching large fields of a tuple in series in accordance with the OpenFlow protocol can be inefficient.

DETAILED DESCRIPTION

The present disclosure discloses a method, system and apparatus for using a single cache table in a switch. As discussed above a single packet may be matched against multiple tables for each different field in an OpenFlow implementation. A packet flow identifier can be defined as a tuple consisting of packet header fields. When a packet enters a switch in an Open Flow implementation, multiple fields in the tuple are matched against a series of corresponding tables for each field to determine an action or routing for the packet.

Examples of the present disclosure provide a method for using a single cache table in the switch rather than separate tables in series for each field of the tuple. In one example, the present disclosure may transform the fields of the tuple into a unique key by applying a mathematical function to the tuple. The single cache table may comprise a plurality of entries. Each entry may include a key and associated actions. As a result, when a packet enters a switch, the key calculated by applying the mathematical function to the tuple of fields of the packet may be compared to a single cache table rather than multiple tables in series to accumulate the associated actions for the packet.

In addition, as new entries are added to the single cache table, a compression algorithm may be applied to the single cache table as a background process. The compression algorithm may merge multiple entries having at least one common field into a single entry. As a result, the number of entries that are compared to the key are further reduced, thereby, further improving the efficiency of using the single cache table in a switch using the OpenFlow protocol.

Figure 1:
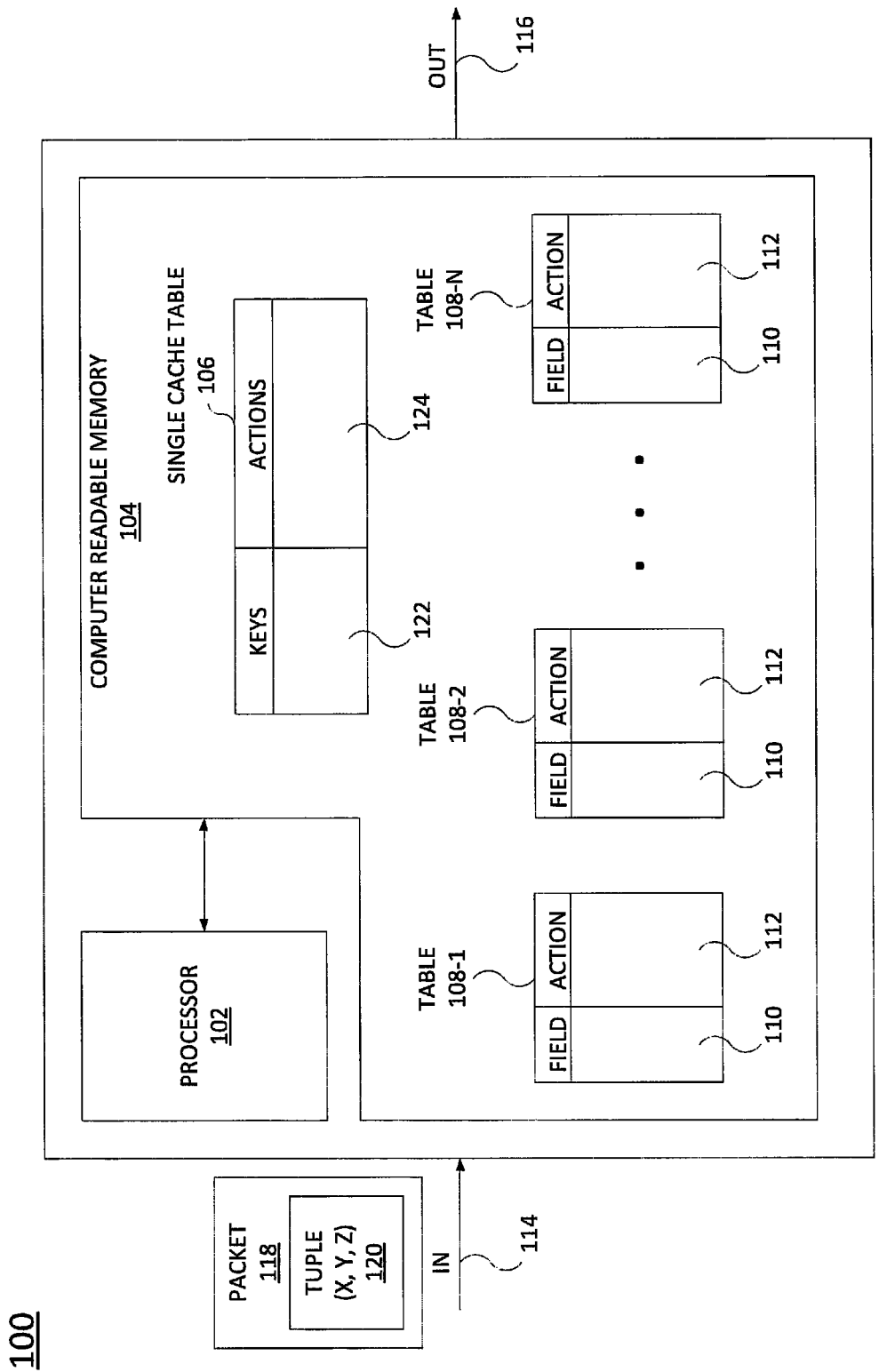
FIG. 1 is an example switch of the present disclosure.

FIG. 1 illustrates an example switch 100 of the present disclosure. In one example, the switch 100 includes a processor 102, a computer readable memory 104, an ingress (in) port 114 and an egress (out) port 116. In one example, the processor 102 may be a central processing unit (CPU) or an application specific integrated circuit (ASIC) processor.

In one example, the switch 100 may receive a packet 118 via the ingress port 114 and transmit the packet 118 via the egress port 116. Although a single packet 118 is illustrated in FIG. 1, it should be noted that the switch 100 may process many packets 118 continuously. In one example, the packet 118 may include a tuple 120 of fields used by the switch 100 to identify and apply actions to the packet 118 before the packet 118 leaves the switch 100.

In one example, the fields of the tuple 120 may be any type of fields used by the switch 100 to apply an action to the packet 118 using the OpenFlow protocol.

In one example, the switch 100 may operate using an OpenFlow protocol to identify and apply the actions to the packet 118. However, the present disclosure may be used for any switch communication protocol that uses a series of look up tables to be used to accumulate actions for each field of a tuple of fields of a packet. The OpenFlow protocol is one example of a switch communication protocol that uses a series of look up tables.

In one example, the computer readable medium may include a single cache table 106 and a series of tables 108-1 to 108-N (herein referred to individually as table 108 or collectively as tables 108). In one example, the tables 108 are the tables that are used for the OpenFlow protocol. Examples of tables used in the OpenFlow protocol include flow tables, croup tables, and the like. For example, each table 108 may include a column of field values 110 and a column of actions 112.

In one example, the fields may include an identification number, a priority value, a label, a traffic class, a time to live (TTL) value, a port number, and the like. In one example, the actions may include: copy, pop, push, decrement, set, quality of service actions, group, output, and the like.

When a value of a first field matches an entry in the table 108-1, a particular action may correspond for that match. Then, a value of a second field is matched against an entry in the table 108-2 to find a corresponding action for that match. This is repeated for the Nth field and the Nth table 108-N. The actions are accumulated and applied to the packet 118 before the packet leaves the switch 100.

In one example, many packets 118 may have common fields that require the same actions found in the tables 108. As a result, the same searches on the same fields, resulting in the same group of actions may be performed. However, this can lead to inefficiencies in the switch 100 due to the serial and repetitive nature of the searching performed in the tables 108 for the OpenFlow protocol.

In one example, the switch 100 may use the single cache table 106 instead of the series of tables 108 to find all of the actions associated with the fields of the tuple 120 of the packet 118. In one example, the single cache table 106 may include a column of keys 122 and a column of actions 124. In one example, the column of keys 122 may simply include a plurality of columns for each field in the tuple 120.

In one example, a mathematical function may be applied to the tuple 120 to calculate a unique key that is stored as an entry in the column of keys 122. In a first instance of seeing a particular tuple 120, the tables 108 may be used to identify the corresponding actions. The group of actions may be associated with the tuple 120 and stored in the actions column 124 for the associated key that corresponds to the tuple 120.

In one example, the mathematical function may be a hash function. In one example, any type of hash function may be used (e.g., a Bernstein hash function, a Fowler-Noll-Vo hash function, a Jenkins hash function, and the like). In one example, the mathematical function may be programmed into the processor 102 when the processor 102 is an ASIC chip.

Illustrating an example of how the mathematical function is applied, the tuple 120 may include three fields and be 128 bits long. However, a hash function may be applied to reduce the tuple to a single unique key of 19 bits. Thus, additional efficiency is gained by requiring a search on a smaller amount of information due to applying the hash function to tuple 120.

The next time the tuple 120 is received, the processor 102 may apply the mathematical function to the tuple, calculate the key and search the single cache table 106 for the key. When a match is found, the processor 102 may identify the actions associated with the key and apply the actions to the packet 118 before transmitting the packet 118 out the egress port 116 onto the next destination of the packet 118.

In one example, applying the actions may include executing the actions that are accumulated based upon the match as described above. However, in one example, one of the actions in the OpenFlow protocol may be a "goto" action. Thus, applying the action may actually require sending the packet to another table within the OpenFlow protocol to accumulate additional actions. Thus, the term "applying" may include executing actions or moving the packet to another table when a "goto" action is applied.

In another example, applying the action may include dropping the packet and performing no action. For example, the OpenFlow protocol may drop packets for a "table-miss" (e.g., no match is found for the field in a table). However, in one example, the present disclosure creates a new entry in the single cache table 106 when no match is found. Subsequently, when the fields are matched against the series of tables 108 and a "table-miss" occurs, a "drop" action may be associated with the new entry in the single cache table 106.

To illustrate by example, a tuple (x, y, z) 120 for a packet 118 may be received at the switch 100. A mathematical function f(x, y, z) may be applied to the tuple 120 to calculate a unique key of 19 bits. The single cache table 106 may be searched to see if the unique key matches an entry in the single cache table 106.

In one example, a match is found and the actions push, pop and decrement may be associated with the tuple (x, y, z) 120. Thus, the actions push, pop and decrement are accumulated and applied to the packet 118.

Notably, the switch is programmed to use the OpenFlow protocol and the tables 108 for the OpenFlow protocol are stored in the computer readable memory 104. However, the processor 102 first applies the mathematical function to the tuple 120 and compares the calculated key to entries in the single cache table 106. In other words, the single cache table 106 is used initially, or first, instead of using the tables 108 to execute the OpenFlow protocol.

In one example, if no match is found, the tuple (x, y, z) 120 may be a new tuple that the switch 100 has not received. If the tuple (x, y, z) 120 is a new tuple 120, then a new entry can be created in the single cache table 106. For example, the processor 102 may use the tables 108 to perform a traditional OpenFlow protocol search for each field x, y and z of the tuple 120 and accumulate the associated actions. The key calculated by applying the hash function on the tuple (x, y, z) 120 may be stored in the column of keys 122 as a new entry and the actions obtained from the tables 108 may be stored in the column of actions 124 for the new entry.

In one example, the single cache table 106 may be a ternary content-addressable memory (TCAM) table. A TCAM table allows for a third matching state that includes a wildcard (e.g., an X) or a "don't care" for one or more bits of the stored data word. For example, a search for 1x0 would return matches of 110 and 100.

In one example, the single cache table 106 may be further compressed as a background operation in the switch 100. For example, two or more entries may have at least one common field. For example, two different keys in the column of keys 122 may have the same actions. As a result, the two different keys may be merged into a single entry (e.g., using a new key that corresponds to both keys or including both keys in the same entry) and be associated with the same actions. In another example, when the single cache table 106 uses a column for each field instead of a mathematical function, some common fields with the same action may be merged into a single entry. As a result, by continuously compressing the single cache table 106 additional efficiencies are gained. For example, compressing the single cache table 106 reduces a number of entries that need to be scanned to match a key of a tuple 120 or the fields of the tuple 120.

Figure 2:
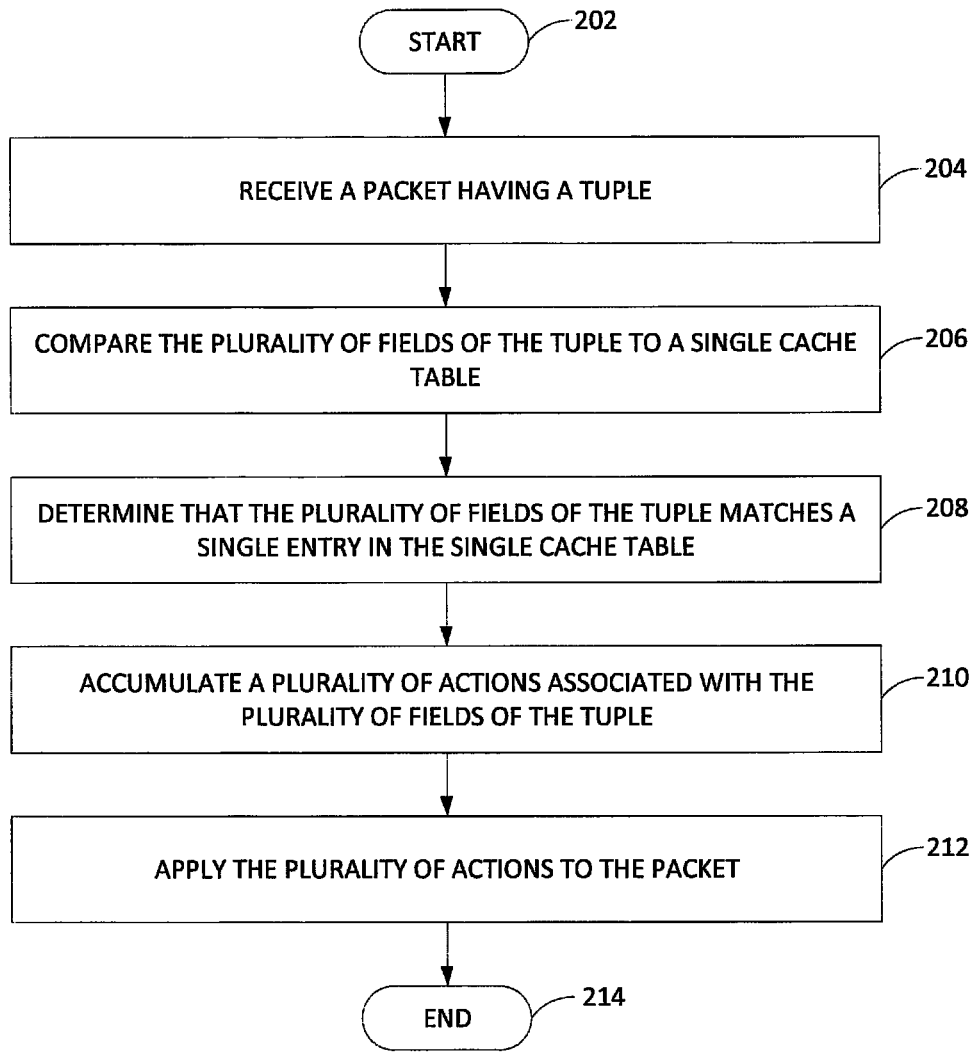
FIG. 2 is a flowchart of an example method for using a single cache table in a switch.

FIG. 2 illustrates an example flowchart of a method 200 for using a single cache table in a switch. In one example, the method 200 may be performed by the processor 102 of the switch 100.

At block 202 the method 200 begins. At block 204, the method 200 receives a packet having a tuple. For example, the switch may receive the packet via an ingress port. The packet may have a tuple of fields that are usually searched in a plurality of tables in series to identify an action for each field match. One example of a switch protocol that uses a series tables is the OpenFlow protocol.

At block 206, the method 200 compares the plurality of fields of the tuple to a single cache table. In one example, instead of using the plurality of tables in series, the switch may compare the plurality of fields of the tuple to entries in the single cache table.

In one example, the single cache table may include a plurality of entries associated with tuples of fields that the switch has previously received and the associated actions for those tuples. As a result, instead of searching multiple tables in series, the present disclosure may require a single look up to accumulate all of the actions that would otherwise have required multiple look ups in each of the plurality of tables.

In one example, a mathematical function may be applied to the fields of the tuple to create a key. In one example, the mathematical function may be a hash function that reduces the number of bits of the tuple (e.g., 128 bits) to 19 bits.

In one example, the single cache table may be a TCAM table. As a result, the hash function may include wildcards or don't care values (e.g., an "X", an "*", and the like).

At block 208, the method 200 determines that the plurality of fields of the tuple matches a single entry in the single cache table. In one example, the fields of the tuple or the key calculated by applying the mathematical function to the fields of the tuple may be compared against each entry in the single cache table. In one example, a match may be found.

In one example, if no match is found, a new entry can be created in the single cache table. For example, the new entry may include the key that was calculated by applying the mathematical function. In addition, the plurality of tables in series may be used to look up each action for each field of the tuple. The accumulated actions may then be stored in the single cache table with the new entry. When the same tuple is received by the switch at a later time, a match may be found and looking up the plurality of tables in series may be avoided.

At block 210, the method 200 accumulates a plurality of actions associated with the plurality of fields of the tuple. For example, when a match is found, the actions associated with the matching entry in the single cache table are accumulated.

At block 212, the method 200 applies the plurality of actions to the packet. In one example, applying the actions may include executing the actions that are accumulated based upon the match as described above. However, in one example, one of the actions in the OpenFlow protocol may be a "goto" action. Thus, applying the action may actually require sending the packet to another table within the OpenFlow protocol to accumulate additional actions. Thus, the term "applying" may include executing actions or moving the packet to another table when a "goto" action is applied.

In another example, applying the action may include dropping the packet and performing no action. For example, the OpenFlow protocol may drop packets for a "table-miss" (e.g., no match is found for the field in a table). However, in one example, the present disclosure creates a new entry in the single cache table when no match is found. Subsequently, when the fields are matched against the series of tables and a "table-miss" occurs, a "drop" action may be associated with the new entry in the single cache table. At block 214, the method 200 ends.

Figure 3:
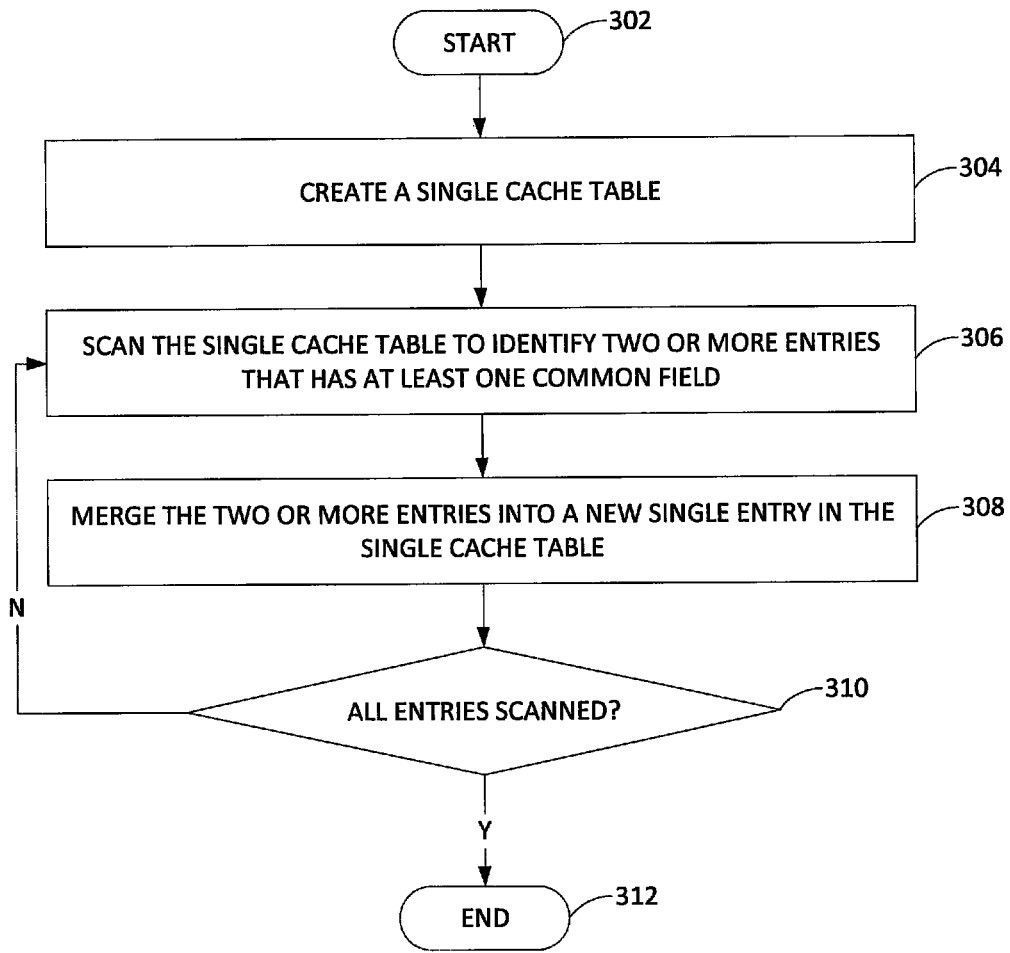
FIG. 3 is a flowchart of an example method for merging entries in the single cache table.

FIG. 3 illustrates an example flowchart of another method 300 for merging entries in the single cache table that is used in the switch. In one example, the method 300 may be performed by the processor 102 of the switch 100.

At block 302 the method 300 begins. At block 304, the method 300 creates a single cache table. In one example, the single cache table comprises a plurality of entries. The single cache table can be used to identify actions for a packet in the switch using an OpenFlow protocol by comparing a plurality of fields of a tuple of the packet entering the switch to the plurality of entries in the single cache table to find a match.

In other words, unlike traditional Open Flow switches that use a series of flow tables to accumulate actions for each field of the tuple, the present disclosure uses the single cache table. As a result, efficiencies are gained by using a single search on a single table as opposed to multiple searches on multiple tables.

In addition, the single cache table may include entries that are keys of shorter bit length than the bit length of the tuple. The keys can be calculated by applying a mathematical function to the fields of the tuple (e.g., a hash function to reduce a 128 bit tuple to a 19 bit key). As a result, additional efficiencies are gained by matching shorting data words (e.g., there are less numbers of bits to compare for each comparison).

In one example, the single cache table may be a TEAM table. As a result, the hash function may include wildcards or don't care values (e.g., an "X", an "*"', and the like).

At block 306, the method 300 scan the single cache table to identify two or more entries that have at least one common field. In one example, some entries within the single cache table may have some entries that have at least one common field. For example, two different key entries may have the same actions (e.g., the at least one common field).

Thus, further efficiencies can be gained in processing the packet through the switch if the single cache table can be compressed. In other words, the lower number of entries in the single cache table, the faster the comparison between the fields of the tuple and the single cache table.

At block 308, the method 300 merges the two or more entries into a new single entry in the single cache table. As noted above, further efficiencies can be gained in processing the packet through the switch if the single cache table can be compressed. As a resulting, merging the two or more entries that have at least one common field into a single entry reduces the number of entries and the overall size of the single cache table.

At block 310, the method 300 determines if all the entries of the single cache table have been scanned. If there are additional entries that need to be scanned (e.g., the answer is no), then the method 300 may return to block 306 and repeat block 306 and block 308 until all of the entries have been scanned. In other words, the scanning and the merging may be repeated until all of the plurality of entries have been scanned.

If the there are no additional entries that need to be scanned (e.g., the answer is yes), then the method 300 may proceed to block 312. At block 312, the method 300 ends.

It should be noted that although not explicitly specified, any of the blocks, functions, or operations of the example methods 300 and 400 described above may include a storing, displaying, and/or outputting block. In other words, any data, records, fields, and/or intermediate results discussed in the methods can be stored, displayed, and/or outputted to another device. Furthermore, blocks, functions, or operations in FIGS. 2 and 3 that recite a determining operation, or involve a decision, do not necessarily require that both branches of the determining operation be practiced.

It will be appreciated that variants of the above-disclosed and other features and functions, or alternatives thereof, may be combined into many other different systems or applications. Various presently unforeseen or unanticipated alternatives, modifications, or variations, therein may be subsequently made which are also intended to be encompassed by the following claims.

The invention claimed is:

1. A method, comprising:
   receiving, by a processor of a switch, a packet having a tuple, wherein the tuple comprises a plurality of fields, wherein the switch operates using a protocol that compares each field of the plurality of fields to a corresponding table of a series of tables;
   comparing, by the processor, the plurality of fields of the tuple to a single cache table instead of the series of tables;
   responsive to determining that the plurality of fields of the tuple matches a single entry in the single cache table, accumulating, by the processor, a plurality of actions associated with the plurality of fields of the tuple based on the single entry;
   responsive to determining that the plurality of fields of the tuple does not match a single entry in the single cache table:
      accumulating, by the processor, the plurality of actions associated with the plurality of fields of the tuple based on a search of the series of tables; and
      creating a new entry in the single cache table based on the plurality of fields of the tuple and the plurality of actions; and
   applying, by the processor, the plurality of actions to the packet.

2. The method of claim 1, further comprising:
   determining, by the processor, that the plurality of fields of the tuple does not match any entry in the single cache table; and
   creating, by the processor, a new entry in the single cache table for the plurality of fields of the tuple.

3. The method of claim 1, wherein the protocol comprises an OpenFlow protocol.

4. The method of claim 1, wherein the single cache table comprises a ternary content-addressable memory (TCAM) table.

5. The method of claim 1, wherein the comparing, further comprises:

applying, by the processor, a function to the plurality of fields of the tuple to calculate a unique key; and performing, by the processor, a look up in the single cache table on the unique key.

6. The method of claim 5, wherein the function comprises a hash function.

7. A switch, comprising:
an ingress port;
an egress port;
a processor; and
a non-transitory computer readable memory storing a plurality of tables for an OpenFlow protocol, a single cache table and a plurality of instructions, which when executed by the processor cause the processor to:
compare a plurality of fields of a tuple of a packet received via the ingress port to the single cache table instead of the plurality of tables;
responsive to determining that the plurality of fields of the tuple matches a single entry in the single cache table, accumulate a plurality of actions associated with the plurality of fields of the tuple based on the single entry;
responsive to determining that the plurality of fields of the tuple does not match a single entry in the single cache table:
accumulate, by the processor, the plurality of actions associated with the plurality of fields of the tuple based on a search of the series of tables; and
create a new entry in the single cache table based on the plurality of fields of the tuple and the plurality of actions;
apply the plurality of actions to the packet; and
transmit the packet via the egress port.

8. The switch of claim 7, wherein the processor comprises an application specific integrated circuit (ASIC) chip.

9. The switch of claim 7, wherein the processor compares each one of the plurality of fields to a corresponding one of the plurality of tables in series to accumulate actions for the plurality of fields when the plurality of fields do not match any entry in the single cache table.

10. The switch of claim 9, wherein a new entry is created in the single cache table with the actions that are accumulated for the plurality of fields of the tuple.

11. A method, comprising:
creating, by a processor of a switch, a single cache table, wherein the single cache table comprises a plurality of entries, wherein the single cache table is used to identify actions for a packet in the switch using an OpenFlow protocol by comparing a plurality of fields of a tuple of the packet entering the switch to the plurality of entries in the single cache table to find a match;
receiving, by the processor, the packet having the tuple, wherein the tuple comprises the plurality of fields;
responsive to determining that the plurality of fields of the tuple matches a single entry in the single cache table, accumulating, by the processor, a plurality of actions associated with the plurality of fields of the tuple based on the single entry;
responsive to determining that the plurality of fields of the tuple does not match a single entry in the single cache table:
accumulating, by the processor, the plurality of actions associated with the plurality of fields of the tuple based on a search of the series of tables; and
creating a new entry in the single cache table based on the plurality of fields of the tuple and the plurality of actions;
scanning, by the processor, the single cache table to identify two or more entries that have at least one common field;
merging, by the processor, the two or more entries into a new single entry in the single cache table; and
repeating, by the processor, the scanning and the merging until all of the plurality of entries have been scanned.

12. The method of claim 11, wherein the scanning, the merging and the repeating are performed as a background process in the switch.

13. The method of claim 11, wherein each of the plurality of entries comprises a unique key calculated by applying a function to the plurality of fields of the tuple.

14. The method of claim 11, wherein the function comprises a hash function.

15. The method of claim 11, wherein the two or more entries comprise different unique keys and the at least one common field comprises the actions.

* * * * *